(12) United States Patent
Ge

(10) Patent No.: US 6,621,579 B2
(45) Date of Patent: Sep. 16, 2003

(54) FRINGE ANALYSIS METHOD AND APPARATUS USING FOURIER TRANSFORM

(75) Inventor: Zongtao Ge, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 66 days.

(21) Appl. No.: 09/816,113

(22) Filed: Mar. 26, 2001

(65) Prior Publication Data

US 2001/0030753 A1 Oct. 18, 2001

(30) Foreign Application Priority Data

Mar. 30, 2000 (JP) .................................. 2000-092714
Nov. 27, 2000 (JP) .................................. 2000-359142

(51) Int. Cl.[7] .............................................. G01B 9/02
(52) U.S. Cl. ...................................................... 356/512
(58) Field of Search .............................. 356/512, 513, 356/514, 490, 495; 250/550; 310/311, 313 R, 313 D

(56) References Cited

U.S. PATENT DOCUMENTS

| | | | | |
|---|---|---|---|---|
| 5,239,361 A | * | 8/1993 | Burch | 356/451 |
| 5,398,113 A | * | 3/1995 | de Groot | 356/360 |
| 5,432,606 A | * | 7/1995 | Noguchi et al. | 356/360 |
| 5,771,095 A | * | 6/1998 | Prikryl et al. | 356/345 |
| 5,822,066 A | * | 10/1998 | Jeong et al. | 356/359 |
| 5,880,841 A | * | 3/1999 | Marron et al. | 356/360 |
| 6,208,416 B1 | * | 3/2001 | Huntley et al. | 356/601 |

OTHER PUBLICATIONS

Brown, Earle B. "Modern Optics." New York: Reinhold Publishing Company, 1965, pp. 80–83.*
Takeda, Mitsuo, "Subfringe Interferometry Fundamentals," Kogaku, pp. 55–65, vol. 13, No. 1, Feb. 1984.

* cited by examiner

Primary Examiner—Stephone B. Allen
(74) Attorney, Agent, or Firm—Snider & Associates; Ronald R. Snider

(57) ABSTRACT

In a fringe analysis method using Fourier transform, fringe image data is determined in a state where a wavefront from an object and a wavefront from a reference are relatively inclined with respect to each other by a minute amount, and a carrier fringe occurring due to this inclination is superposed on a fringe occurring due to wavefront information of the object. The inclination is set such that the carrier frequency occurring due to the inclination is a predetermined multiple of the basic frequency determined by the wavefront information of the object and observing means.

10 Claims, 7 Drawing Sheets

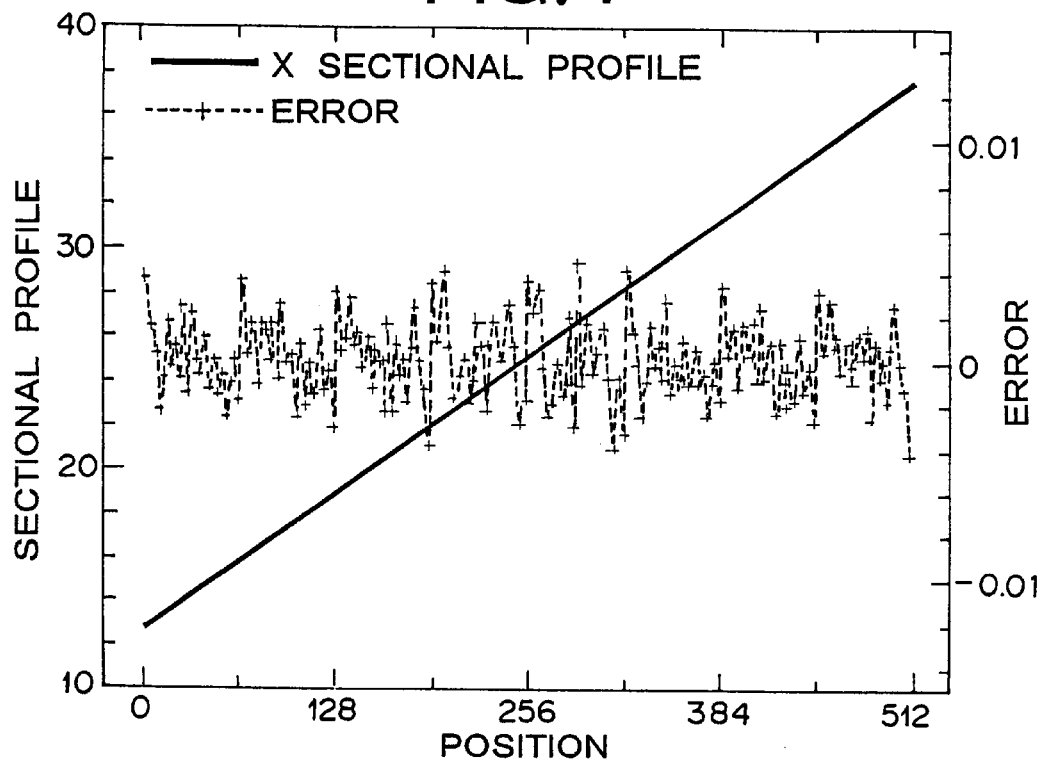
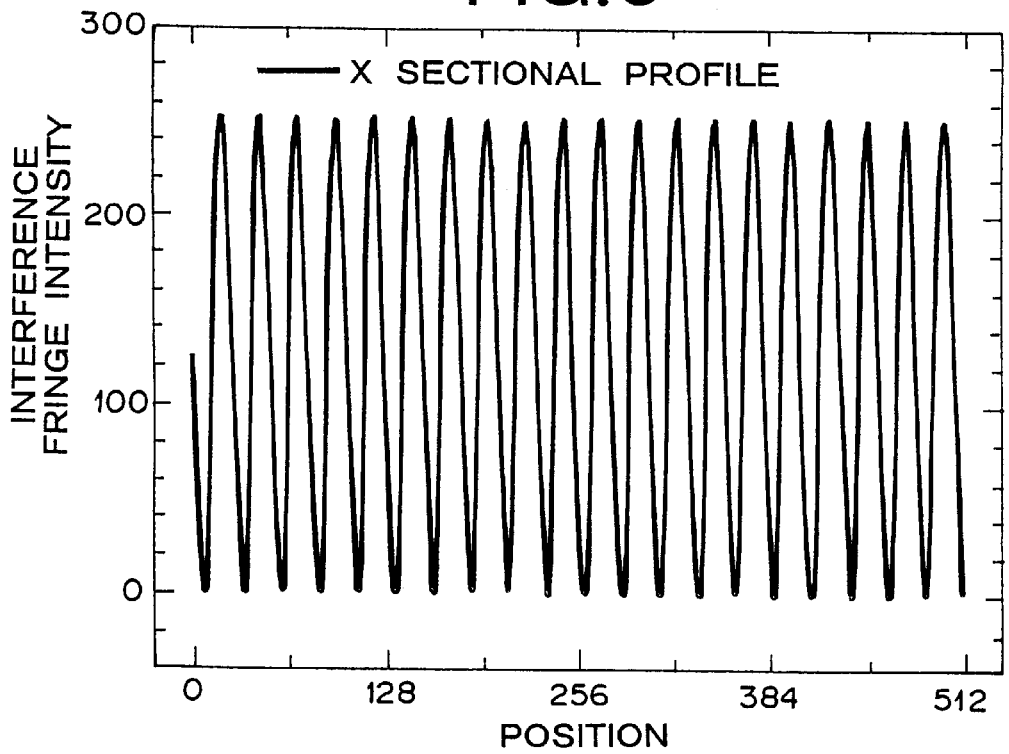

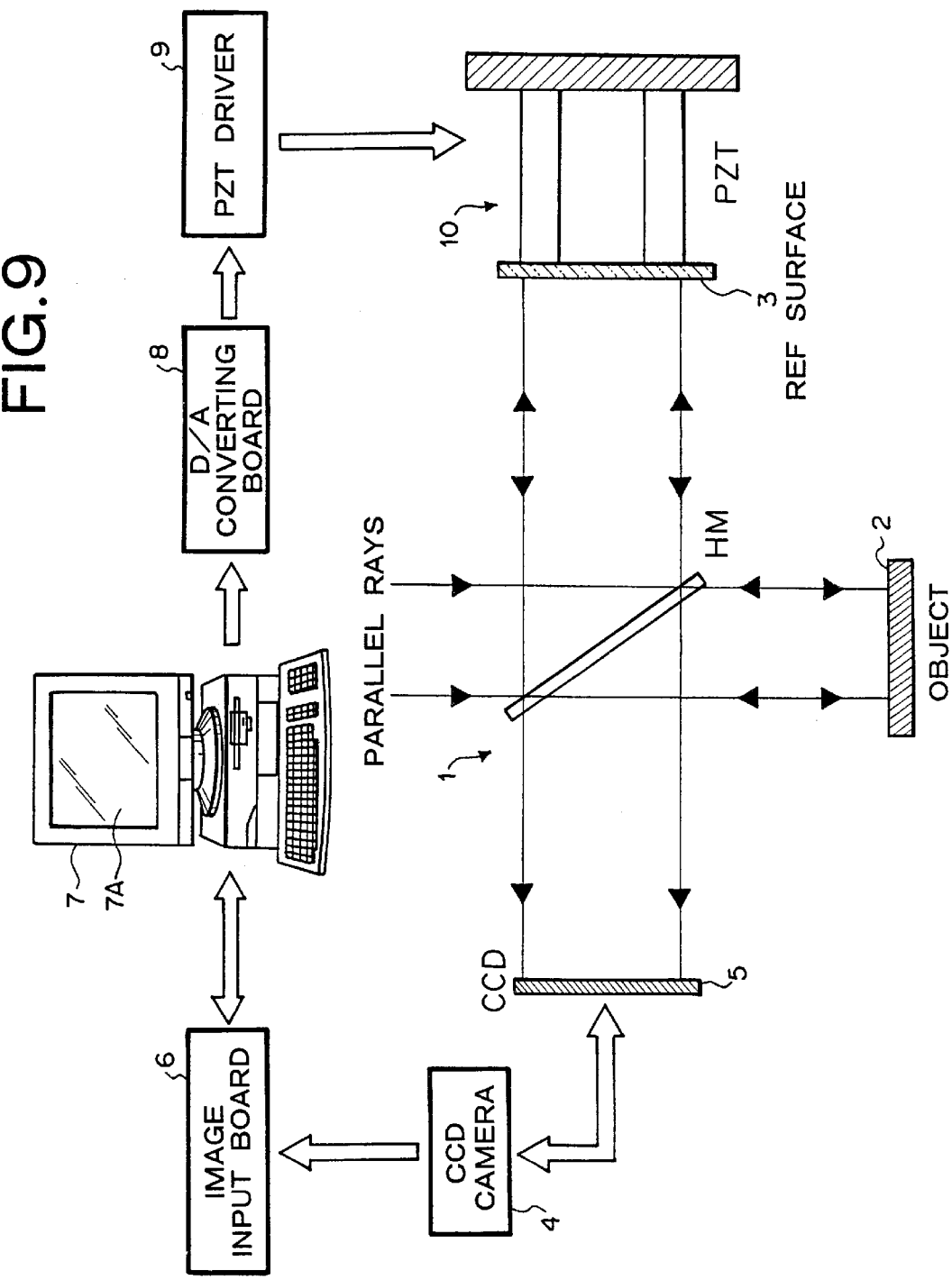

US 6,621,579 B2

FRINGE ANALYSIS METHOD AND APPARATUS USING FOURIER TRANSFORM

RELATED APPLICATIONS

This application claims the priority of Japanese Patent Application No. 2000-092714 filed on Mar. 30, 2000 and Japanese Patent Application No. 2000-359142 filed on Nov. 27, 2000, which are incorporated herein by reference.

BACKGROUND OF THE INVENTION

1. Field of the Invention

The present invention relates to a fringe analysis method and apparatus using Fourier transform; and, in particular, to a fringe analysis method and apparatus which can effectively use Fourier transform method when analyzing image data having fringe patterns such as interference fringe patterns.

2. Description of the Prior Art

Light-wave interferometry has conventionally been known as important means concerning accurate measurement of object wavefront. In recent years, there has been an urgent need for developing an interferometry technique (sub-fringe interferometry) for reading out information from a fraction of a single interference fringe (one fringe) or less from the necessity to measure a surface or wavefront aberration at an accuracy of 1/10 wavelength or higher.

For sub-fringe interferometry techniques, attention has been focused on techniques using Fourier transform method as disclosed in "Basics of Sub-fringe Interferometry," *Kogaku*, Vol. 13, No. 1 (February, 1984), pp. 55–65, for example.

However, the fringe analysis method (Fourier transform fringe analysis method) using Fourier transform, which is excellent in principle, leaves some problems unsolved and has not always been effectively put into practice.

One of these problems lies in that a large analysis error may occur in the Fourier transform method when introducing a carrier frequency.

The Fourier transform fringe analysis method will now be explained.

Fourier transform fringe analysis method is a technique which makes it possible to determine the phase of a wavefront with high accuracy from a single sheet of fringe image by introducing a carrier frequency (caused by an inclination of a surface to be measured or a reference). When the carrier frequency is introduced, the interference fringe intensity is represented by the following expression (1):

$$i(x, y) = a(x, y) + b(x, y)\cos(2\pi f_x x + 2\pi f_y y + \phi(x, y)) \quad (1)$$

where $a(x, y)$ is the background of interference fringes;
$b(x, y)$ is the visibility of fringes;
$\phi(x, y)$ is the phase of the wavefront; and
$f_x$ and $f_y$ are the respective carrier frequencies in the x and y directions represented by:

$$f_x = \frac{2 \cdot \tan\theta_x}{\lambda}, \quad f_y = \frac{2 \cdot \tan\theta_y}{\lambda}$$

where $\lambda$ is the wavelength of light, and $\theta_x$ and $\theta_y$ are the respective inclinations of the surface to be observed in the x and y directions.

The above-mentioned expression (1) can be converted into the following expression (2):

$$i(x, y) = a(x, y) + c(x, y)\exp[i(2\pi f_x x + 2\pi f_y y)] + c^*(x, y)\exp[i(2\pi f_x x + 2\pi f_y y)] \quad (2)$$

where $c(x, y)$ is the complex amplitude of interference fringes, and $c^*(x, y)$ is the complex conjugate of $c(x, y)$.

Here, $c(x, y)$ is represented as the following expression (3):

$$c(x, y) = \frac{b(x, y)\exp[i\phi(x, y)]}{2} \quad (3)$$

The Fourier transform of expression (2) gives:

$$I(\eta, \zeta) = A(\eta, \zeta) + C(\eta - f_x, \zeta - f_y) + C^*(\eta - f_x, \zeta - f_y) \quad (4)$$

where $A(\eta, \zeta)$ is the Fourier transform of $a(x, y)$, whereas $C(\eta - f_x, \zeta - f_y)$ and $C^*(\eta - f_x, \zeta - f_y)$ are the Fourier transforms of $c(x, y)$ and $c^*(x, y)$, respectively.

Subsequently, $C(\eta - f_x, \zeta - f_y)$ is taken out by filtering, and the peak of the spectrum located at coordinates ($f_x$, $f_y$) is transferred to the origin of a frequency coordinate system (also referred to as Fourier spectra plane coordinate system), so as to eliminate the carrier frequencies. Then, $c(x, y)$ is determined by use of inverse Fourier transform, and the wrapped measured phase can be obtained by:

$$\phi(x, y) = \frac{\mathrm{Im}(c(x, y))}{\mathrm{Re}(c(x, y))} \quad (5)$$

where $\mathrm{Im}(c(x,y))$ is the imaginary part of $c(x,y)$ and $\mathrm{Re}(c(x,y))$ is the real part of $c(x,y)$.

Finally, unwrapping processing is carried out, so as to determine the phase $\phi(x, y)$ of the wavefront to be measured.

In the Fourier transform fringe analysis method explained in the foregoing, while the fringe image data modulated by a carrier frequency is subjected to Fourier transform as mentioned above, a large error is often included in the result of arithmetic operation at this time in practice. The error in analysis may extend to about a few percent of the wavelength, thereby becoming a major factor which hinders such a technique from being put into practice.

SUMMARY OF THE INVENTION

Therefore, it is a first object of the present invention to provide a fringe analysis method and apparatus using Fourier transform method which can efficiently determine the posture of the object according to fringe image data in which a carrier frequency is introduced.

It is a second object of the present invention to provide a fringe analysis method and apparatus which can minimize errors in arithmetic operations when fringe image data in which a carrier frequency is introduced is subjected to Fourier transform method, thereby yielding favorable analysis results with less errors.

The present invention provides a fringe analysis method using Fourier transform, in which fringe image data carrying wavefront information of an object is obtained according to a relative wavefront profile of the object with respect to a reference, the fringe image data being in a state where a wavefront from the object and a wavefront from the reference are relatively inclined by a minute amount with respect to each other and a carrier fringe occurring due to the inclination is superposed on a fringe occurring due to the wavefront information of the object;

the method comprises the step of subjecting the fringe image data to Fourier transform method so as to determine a wavefront profile of the object;

the inclination is set such that a carrier frequency occurring due to the inclination is a predetermined multiple of the basic frequency determined by the wavefront information of the object and observing means.

Preferably, in the fringe analysis method using Fourier transform in accordance with the present invention, the inclination is set such that a carrier frequency occurring due to the inclination is substantially an integral multiple of the basic frequency determined by the wavefront information of the object and observing means.

The present invention provides a fringe analysis apparatus using Fourier transform method, in which fringe image data carrying wavefront information of an object obtained according to a relative wavefront profile of the object with respect to a reference is subjected to Fourier transform method so as to determine a wavefront profile of the object; the apparatus comprises:

an inclination adjusting mechanism for adjusting a relative inclination of a wavefront from the object and a wavefront from the reference with respect to each other; and an inclination adjusting mechanism driving means for driving the inclination adjusting mechanism such that a carrier frequency occurring due to the inclination is a predetermined multiple of the basic frequency determined by the wavefront information of the object and observing means.

Preferably, in the fringe analysis apparatus using Fourier transform method in accordance with the present invention, the inclination adjusting mechanism driving means drives the inclination adjusting mechanism such that a carrier frequency occurring due to the inclination is substantially an integral multiple of the basic frequency determined by the wavefront information of the object and observing means.

In an embodiment in this case, the inclination adjusting mechanism adjusts a relative inclination of the object and the reference with respect to each other, and the inclination adjusting mechanism driving means drives the inclination adjusting mechanism such that a carrier frequency occurring due to the inclination is substantially an integral multiple of the basic frequency determined by the wavefront information of the object and observing means.

Though not restrictive, the inclination adjusting mechanism may comprise members composed of one fulcrum member and two piezoelectric actuators or three piezoelectric actuators for inclining the object or a reference member provided with the reference, the members being arranged such that two lines on the reference member connecting the fulcrum member to the respective piezoelectric actuators are orthogonal to each other; or may have a tube-shaped piezoelectric actuator, adapted to incline in two axial directions, for driving the object or a reference member provided with the reference.

The fringe analysis apparatus using Fourier transform method may comprise:

imaging means for capturing the fringe image;

carrier frequency calculating means for calculating according to the captured fringe image data a carrier frequency occurring in response to a relative inclination of the object and the reference with respect to each other;

frequency difference calculating means for calculating a difference between the carrier frequency becoming an integral multiple of the basic frequency determined by the wavefront information of the object and observing means, and the calculated carrier frequency; and inclination amount adjusting means for calculating a relative inclination amount of the object and the reference with respect to each other which is required for correcting the difference between frequencies, and sending out a signal corresponding to thus calculated inclination amount to the inclination adjusting mechanism driving means;

so as to feedback-control the relative inclination amount of the object and the reference with respect to each other.

In the calculation carried out by the carrier frequency calculating means, the captured fringe image data may be subjected to Fourier transform method, so as to determine a carrier frequency value ($f_x$, $f_y$) according to positional coordinates of a maximum peak excluding a peak located at the origin among peaks on a frequency coordinate system obtained by the Fourier transform method.

Here, the basic frequency is represented by the following expressions:

basic frequency in x direction $f_{sx} = 1/N_x$ basic frequency in y direction $f_{sy} = 1/N_y$ where $N_x$ is the number of sampling points in x direction, and $N_y$ is the number of sampling points in y direction.

The fringe image data may be interference fringe image data.

The fringe image data may be captured by use of a Michelson type interferometer.

Here, the wavefront information of the object does not include the wavefront profile caused by the relative inclination of the object and reference with respect to each other that is provided for generating the carrier frequency.

Furthermore, the wavefront information may be surface profile information of the object.

BRIEF DESCRIPTION OF THE DRAWINGS

FIG. 4 is a graph showing an x-sectional profile obtained when the interference fringe intensity distribution shown in FIG. 3 is subjected to Fourier transform processing, and its error from the actual profile in this case;

FIG. 5 is a graph showing an interference fringe intensity distribution in x direction when 20.3 (non-integral number of) carrier fringes are superposed on the object surface within an analysis area (Embodiment 2);

FIG. 9 is a block diagram showing the apparatus in accordance with an embodiment of the present invention;

DESCRIPTION OF THE PREFERRED EMBODIMENTS

In the following, an embodiment of the fringe analysis method using Fourier transform method in accordance with the present invention will be explained in detail with reference to the drawings.

This method is a fringe analysis method in which, when interference fringe image data of an object surface obtained according to a relative surface profile of the object surface with respect to a reference surface is subjected to Fourier transform so as to analyze the surface profile of object surface, the object surface and the reference surface are relatively inclined with respect to each other, and a carrier fringe (included in the concept of carrier frequency, ditto for the following) occurring due to this inclination is superposed on the fringe generated due to the surface profile information of the object, so as to determine the fringe image data. In this method, in particular, the inclination is set such that the carrier frequency occurring due to the inclination is a predetermined multiple of the basic frequency determined by the surface profile information of the object and observing means.

Preferably, as will be explained in the following, the introduced carrier frequency and the basic frequency determined by the surface profile information of the object and observing means are set such that the predetermined multiple is substantially an integral multiple. In this case, the analysis error can be reduced greatly. Namely, when expressed physically and conceptually, this configuration is a technique for setting the above-mentioned inclination such that an integral number of carrier periods just exist within the area to be analyzed.

While the number of carrier fringes will be mentioned in the following explanation, a single carrier fringe corresponds to one of the above-mentioned carrier periods.

Figure 1:
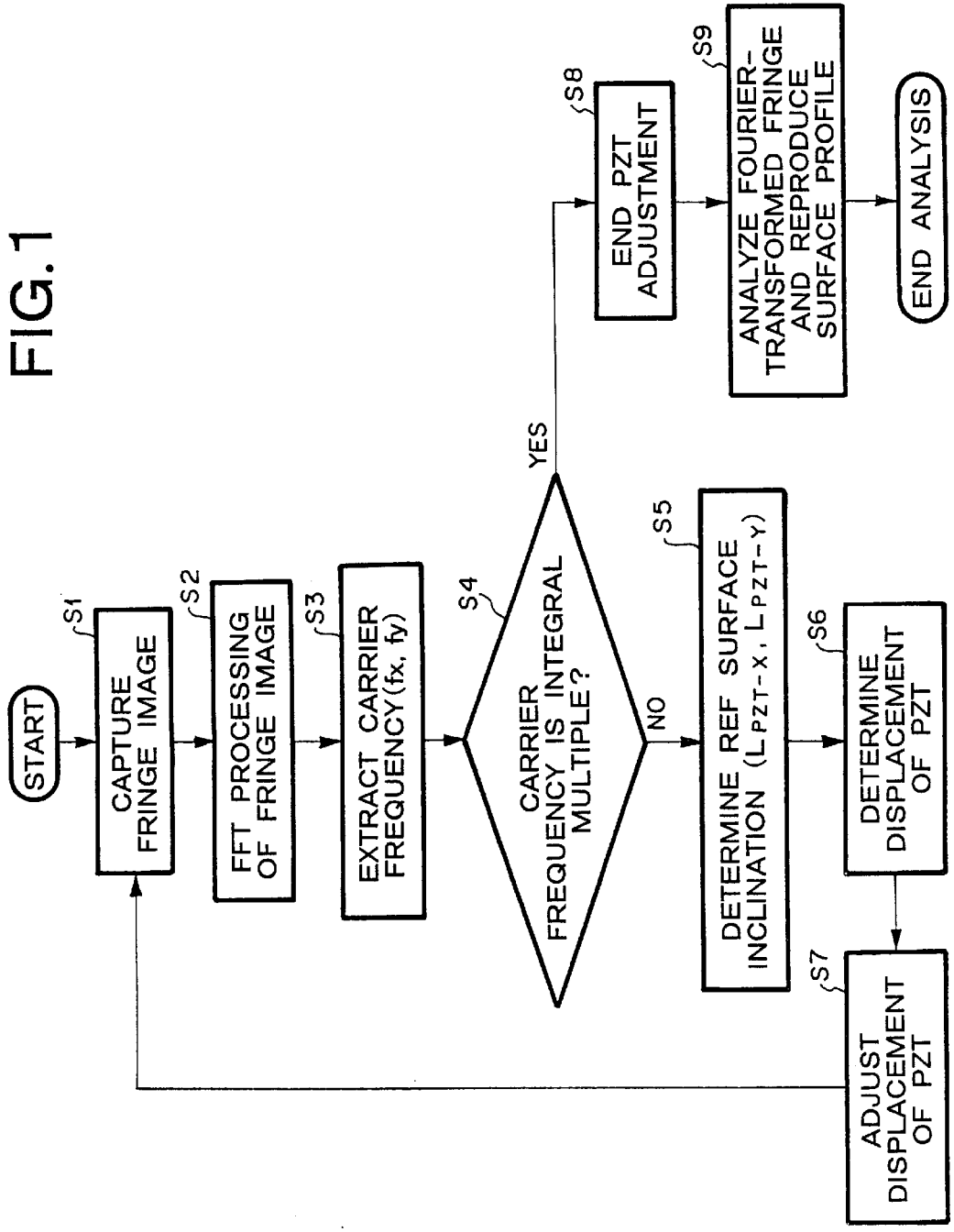
FIG. 1 is a flowchart for explaining an embodiment of the present invention.

FIG. 1 is a flowchart specifically showing the method of this embodiment.

First, an interference fringe image carrying surface profile information of an object, on which spatial carrier fringes are superposed, is captured by a CCD imaging camera (S1). Subsequently, thus obtained interference fringe image data is subjected to Fourier transform (S2), a spatial carrier frequency ($f_x$, $f_y$) is extracted (S3), and it is determined whether or not this carrier frequency is an integral multiple of the basic frequency of a fringe pattern representing the surface profile of object (S4).

If it is not an integral multiple as a result of this determination, then the inclination $L_{PZT-X}$ of the reference surface in the x-axis direction is determined by use of expression (9) which will be explained later, and expression (10) is normally used for determining the inclination $L_{PZT-Y}$ of the reference surface in the y-axis direction (S5). According to the current amount of inclination of the reference surface, the positive or negative displacement of a PZT (piezoelectric device) actuator necessary for causing the carrier frequency to become an integral multiple of the basic frequency of fringe pattern representing the surface profile of object is determined (S6). Then, the driving amount of PZT (piezoelectric device) actuator is adjusted (S7) such that the PZT (piezoelectric device) actuator is provided with the positive or negative displacement determined at step 6 (S6). Thereafter, the flow returns to step 1 (S1).

If the carrier frequency is considered to be an integral multiple of the basic frequency of fringe pattern representing the surface profile of object as a result of the determination at step 4 (S4), then it is assumed that the driving amount of the PZT (piezoelectric device) actuator has been adjusted (S8), and the fringe analysis processing, which will be explained later, is carried out, so as to perform processing for reproducing the surface profile of object (S9).

Letting $f_x$ and $f_y$ be the x- and y-directional components of the spatial carrier frequency, the interference fringe image data obtained at step 1 (S1) is represented by the following expression (6):

$$i(x, y) = a(x, y) + b(x, y)\cos(2\pi f_x x + 2\pi f_y y + \phi(x, y)) \qquad (6)$$

where $a(x, y)$ is the background of interference fringes;

$b(x, y)$ is the visibility of fringes;

$\phi(x, y)$ is the phase of the object; and $f_x$ and $f_y$ are the respective carrier frequencies in the x and y directions represented by:

$$f_x = \frac{2 \cdot \tan\theta_x}{\lambda}, \quad f_y = \frac{2 \cdot \tan\theta_y}{\lambda}$$

where $\lambda$ is the wavelength of light, and $\theta_x$ and $\theta_y$ are the inclinations of the surface to be observed in the x and y directions, respectively.

The above-mentioned expression (6) can be converted into the following expression (7):

$$i(x, y) = a(x, y) + c(x, y)\exp[i(2\pi f_x x + 2\pi f_y y)] + c^*(x,y)\exp[i(2\pi f_x x + 2\pi f_y y)] \qquad (7)$$

where $c(x, y)$ is the complex amplitude of interference fringes, and $c^*(x, y)$ is the complex conjugate of $c(x, y)$.

Here, $c(x, y)$ is represented as the following expression (8):

$$c(x, y) = \frac{b(x, y)\exp[i\phi(x, y)]}{2} \qquad (8)$$

When the above-mentioned expression (7) is Fourier-transformed, the following expression (9) is obtained:

$$I(\eta,\zeta) = A(\eta,\zeta) + C(\eta - f_x, \zeta - f_y) + C^*(\eta - f_x, \zeta - f_y) \qquad (9)$$

where $A(\eta,\zeta)$ is the Fourier transform of $a(x, y)$, whereas $C(\eta - f_x, \zeta - f_y)$ and $C^*(\eta - f_x, \zeta - f_y)$ are the Fourier transforms of $c(x, y)$ and $c^*(x, y)$, respectively.

At the above-mentioned step 3 (S3), the second term component of the above-mentioned expression (9) is taken out alone by filtering, and the carrier frequency ($f_x$, $f_y$) is extracted according to the peak of spectrum located at coordinates ($f_x$, $f_y$) on the frequency coordinates.

At the above-mentioned step 9 (S9), the obtained $C(\eta - f_x, \zeta - f_y)$ is expanded on the frequency coordinates, and the peak of spectrum positioned at coordinates ($f_x$, $f_y$) is moved to the origin on the frequency coordinates so as to eliminate the carrier frequency. Thereafter, inverse Fourier transform is carried out so as to determine $c(x, y)$, and the wrapped phase to be measured can be obtained by:

$$\phi(x, y) = \frac{\text{Im}(c(x, y))}{\text{Re}(c(x, y))} \quad (10)$$

where Im(c(x, y)) is the imaginary part of c(x,y), and Re(c(x,y)) is the real part of c(x, y).

Since the obtained phase distribution is discontinuously folded between the principal values from $-\pi$ to $\pi$, a continuous phase ($\phi(x, y)$: phase distribution) corresponding to the surface profile of the measured object can be obtained when these discontinuous parts are unwrapped by a phase unwrapping algorithm such as maximum-amplitude method.

Expressions (11) and (12) for determining the respective inclinations $L_{PZT-X}$ and $L_{PZT-Y}$ of reference surface in the x- and y-directions at step 5 (S5) are represented as follows:

$$f_x = \frac{2 \cdot \tan\theta_x}{\lambda} = \frac{2 \cdot L_{PZT-X}}{L_x \cdot \lambda} \quad (11)$$

$$f_y = \frac{2 \cdot \tan\theta_y}{\lambda} = \frac{2 \cdot L_{PZT-Y}}{L_y \cdot \lambda} \quad (12)$$

The apparatus in accordance with an embodiment of the present invention will now be explained with reference to FIGS. 9 and 10.

This apparatus is used for carrying out the above-mentioned method of the embodiment. As shown in FIG. 9, in a Michelson type interferometer 1, interference fringes formed by respective reflected luminous fluxes from the object surface 2 and reference surface 3 are captured at the imaging surface of CCD 5 of an imaging camera 4. By way of an image input board 6, the captured interference fringe data is fed to a computer 7 equipped with a CPU and a memory for image processing. Thus input interference fringe image data is subjected to various kinds of arithmetic processing, and the result of processing is displayed on a monitor screen 7A. The interference fringe image data output from the CCD 5 is temporarily stored into the memory due to the processing by the CPU.

Figure 10:
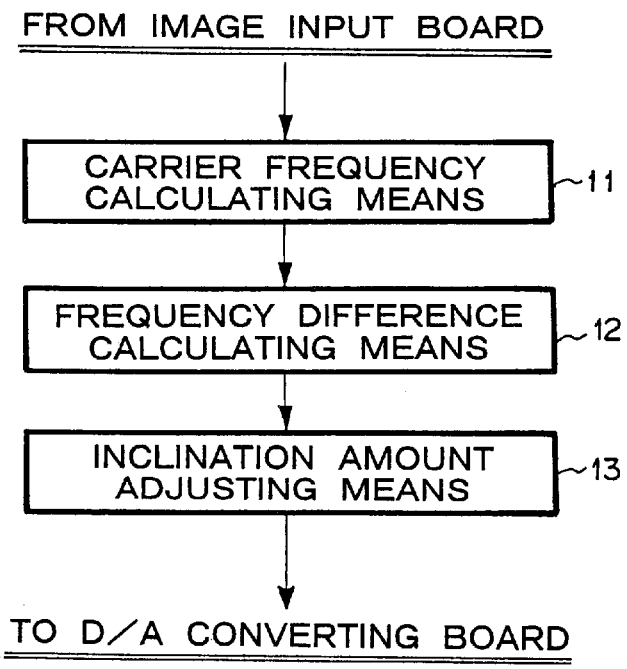
FIG. 10 is a block diagram for explaining a part of FIG. 9 in detail.

As shown in FIG. 10, the computer 7 comprises a carrier frequency calculating means 11, a frequency difference calculating means 12, and an inclination amount adjusting means 13 in terms of software. As mentioned above, the carrier frequency calculating means 11 carries out the processing at step 3 (S3) for subjecting the obtained interference fringe image data to Fourier transform and extracting the carrier frequency ($f_x$, $f_y$). The frequency difference calculating means 12 calculates the difference between the carrier frequency becoming an integral multiple of the basic frequency of the fringe pattern generated due to the surface profile information of the object surface 2 and the current carrier frequency calculated by the carrier frequency calculating means 11, thereby performing the determination processing corresponding to the above-mentioned step 4 (S4). The inclination amount adjusting means 13 determines the inclinations $L_{PZT-X}$, $L_{PZT-Y}$ of reference surface 3 in x and y-axis directions according to the frequency difference calculated by the frequency difference calculating means 12. According to the current inclination amount of reference surface 3, the inclination amount adjusting means 13 obtains the positive or negative displacement of a PZT (piezoelectric device) actuator 10 required for the carrier frequency to become an integral multiple of the basic frequency of the fringe pattern representing the surface profile of object, and instructs a piezoelectric driving section 9 to send out a driving signal to the PZT (piezoelectric device) actuator 10 so as to fulfill the positive or negative displacement.

As a consequence, the PZT (piezoelectric device) actuator 10 is displaced by a predetermined amount, whereby the reference surface 3 of a reference mirror held by the PZT (piezoelectric device) actuator 10 is adjusted so as to incline by the predetermined amount. Since the object surface 2 is stationary, the relative inclination of the object surface 2 and the reference surface 3 with respect to each other depends only on the amount of inclination of the reference surface 3 inclined by the PZT (piezoelectric device) actuator 10.

Therefore, the system constituted by the elements shown in FIGS. 9 and 10 mentioned above form a feedback loop which adjusts the carrier frequency changing according to the inclination of reference surface 3 so as to make it become an integral multiple of the basic frequency of the fringe pattern representing the surface profile of object.

Figure 11A:
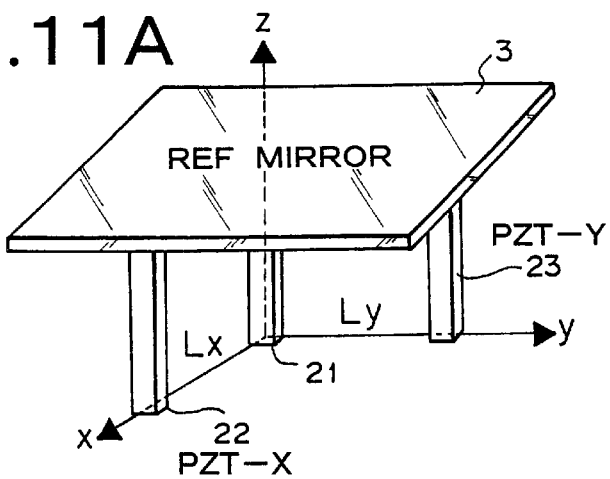
FIGS. 11A and 11B are schematic views showing respective modes of the PZT actuator shown in FIG. 9.
Figure 11B:
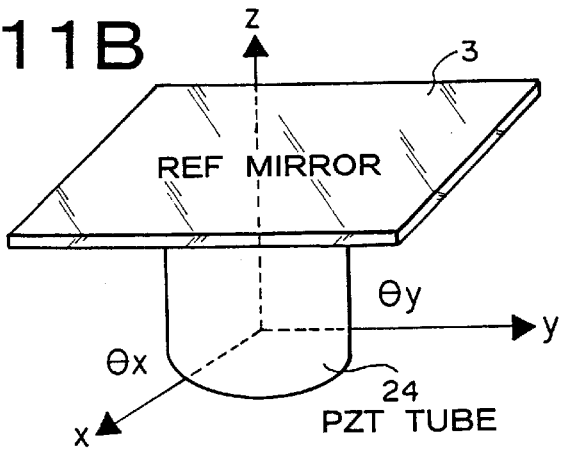

FIGS. 11A and 11B show two modes of the PZT (piezoelectric device) actuator 10, respectively.

As shown in FIG. 11A, the first mode comprises one fulcrum member 21 and two piezoelectric devices 22, 23 for supporting the rear side of the reference surface (reference mirror), whereas two lines Lx, Ly connecting the fulcrum member 21 to the respective piezoelectric devices 22, 23 are orthogonal to each other. The reference surface 3 inclines in the x-axis direction when the piezoelectric device 22 extends/shrinks, and in the y-axis direction when the piezoelectric device 23 extends/shrinks. On the other hand, as shown in FIG. 11B, the second mode is configured such that the center part of the rear side of the reference surface (reference mirror) 3 is supported by a cylindrical piezoelectric tube 24. As the piezoelectric tube 24 eccentrically expands/shrinks, the reference surface 3 of reference mirror is freely inclined in the x- and y-axis direction as in the first mode.

In the following, a phenomenon occurring when a carrier frequency which is an integral multiple of the basic frequency of the fringe pattern representing the surface profile of object is generated will be investigated.

Figure 2:
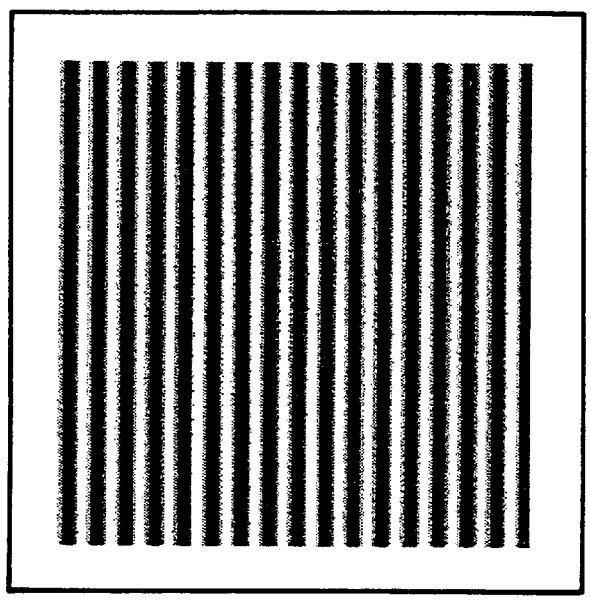
FIG. 2 is a schematic view showing interference fringe image data of an object.

Studied here is a case where the reference surface 3 of reference mirror is inclined with respect to the object surface 2, such that 20 (integral number of) carrier fringes are superposed on the object surface 2 within its analysis area (Embodiment 1), whereby the interference fringe image data shown in FIG. 2 is obtained.

Figure 3:
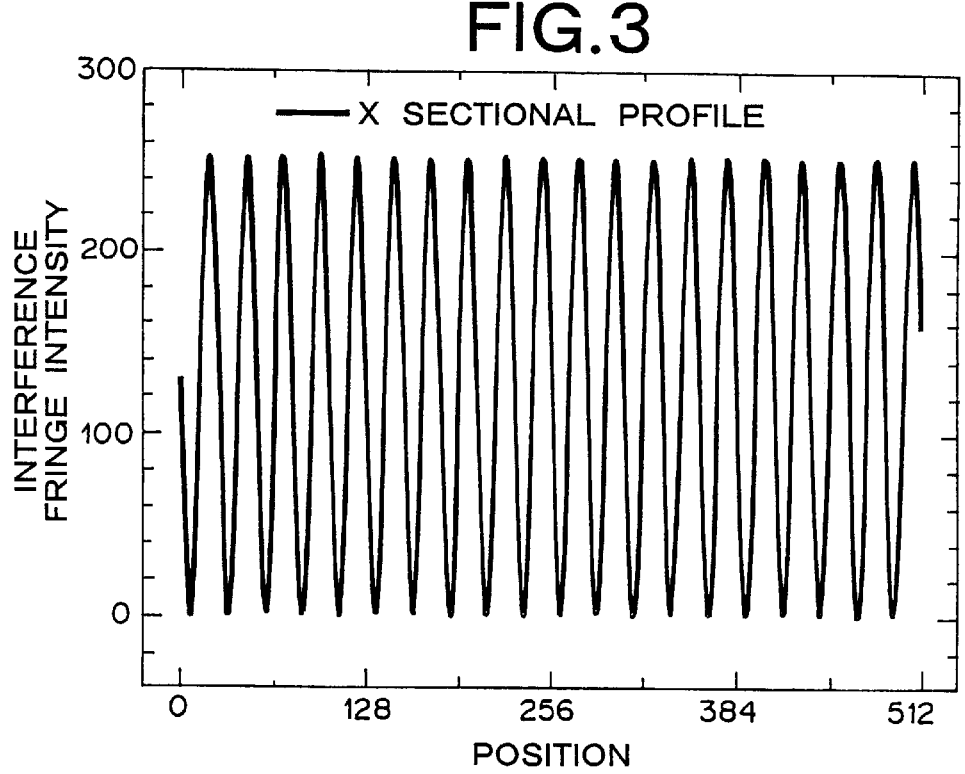
FIG. 3 is a graph showing an interference fringe intensity distribution in x direction when 20 (integral number of) carrier fringes are superposed on the object surface within an analysis area (Embodiment 1)

FIG. 3 shows a periodic interference fringe intensity change in the x direction when carrier fringes of such a frequency are superposed.

FIG. 4 shows the x-sectional profile of the object surface 2 obtained when the interference fringe image data on which the carrier fringes are superposed is subjected to predetermined Fourier transform processing (DFT (discrete Fourier transform) in this case), and the error from the actual profile in this case.

As can be seen from FIG. 4, the analysis error is kept within the range of about ±0.004 radian (about ±0.03% of wavelength), which is a practically unproblematic range, in Embodiment 1 in which an integral number of (20) carrier fringes are superposed on the object within its analysis area and the Fourier transform processing is carried out.

Next, a case where 20.3 carrier fringes, which are slightly greater in number than those shown in FIG. 2, are superposed on the object within its analysis area (Embodiment 2) will be studied. FIG. 5 shows a periodic interference fringe intensity change in the x direction when carrier fringes of such a frequency are superposed.

Figure 6:
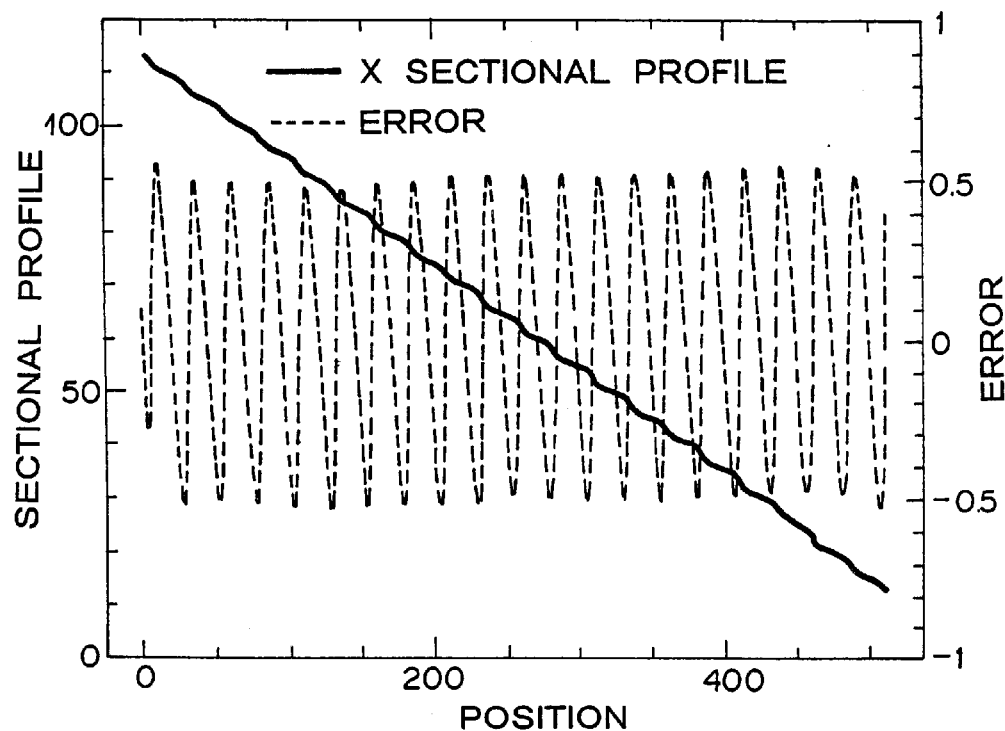
FIG. 6 is a graph showing an x-sectional profile obtained when the interference fringe intensity distribution shown in FIG. 5 is subjected to Fourier transform processing, and its error from the actual profile in this case.

FIG. 6 shows the x-sectional profile of object surface 2 obtained after the Fourier transform processing identical to that in the above-mentioned Embodiment 1 is carried out in this case, and the error from the actual profile in this case.

As can be seen from FIG. 6, the analysis error of about ±0.6 radian (about ±5% of wavelength) occurs as an analysis error in Embodiment 2 in which a non-integral number of (20.3) carrier fringes are superposed on the object within its analysis area and the Fourier transform processing is carried out. However, it is still usable in circumstances where a very high accuracy is not required.

Figure 7:
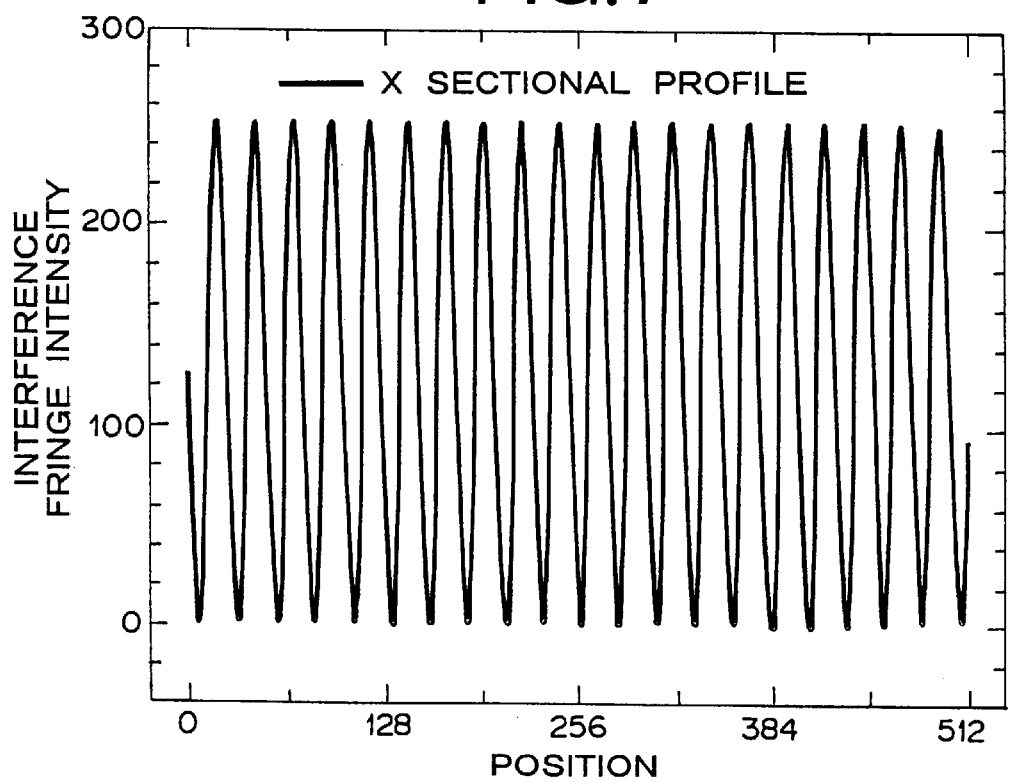
FIG. 7 is a graph showing an interference fringe intensity distribution in x direction when 20.5 (non-integral number of) carrier fringes are superposed on the object surface within an analysis area (Embodiment 3)

Next, a case where 20.5 carrier fringes, which are slightly greater in number than those shown in FIG. 2 or in Embodiment 2, are superposed on the object within its analysis area (Embodiment 3) will be studied. FIG. 7 shows a periodic interference fringe intensity change in the x direction when carrier fringes of such a frequency are superposed.

Figure 8:
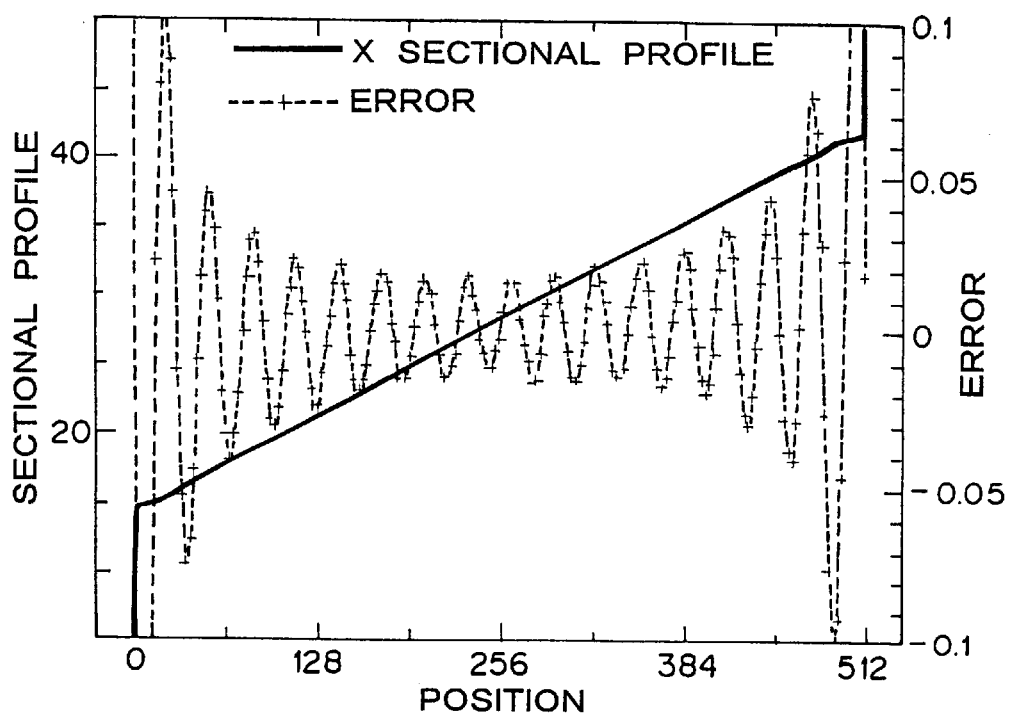
FIG. 8 is a graph showing an x-sectional profile obtained when the interference fringe intensity distribution shown in FIG. 7 is subjected to Fourier transform processing, and its error from the actual profile in this case.

FIG. 8 shows the x-sectional profile of object surface 2 obtained after the Fourier transform processing identical to that in the above-mentioned Embodiment 1 is carried out in this case, and the error from the actual profile in this case.

As can be seen from FIG. 8, while the analysis error is about ±0.02 radian (about ±0.3% of wavelength) at the center part in Embodiment 3 in which a non-integral number of (20.5) carrier fringes are superposed on the object within its analysis area and the Fourier transform processing is carried out, a large error of about ±0.3 radian (about ±4% of wavelength) occurs in marginal parts (both end parts). Yet, it is still usable in practice when only the center part within the range shown in FIG. 8 is employed.

From the foregoing studies, it is clear that, while practical use is possible even when the number of carrier fringes occurring due to an inclination is not set to a divisible integral according to the surface profile information of the object, the analysis error can be suppressed to about $\frac{1}{10}$ to $\frac{1}{100}$ if it is set to a divisible integral.

Figure 12:
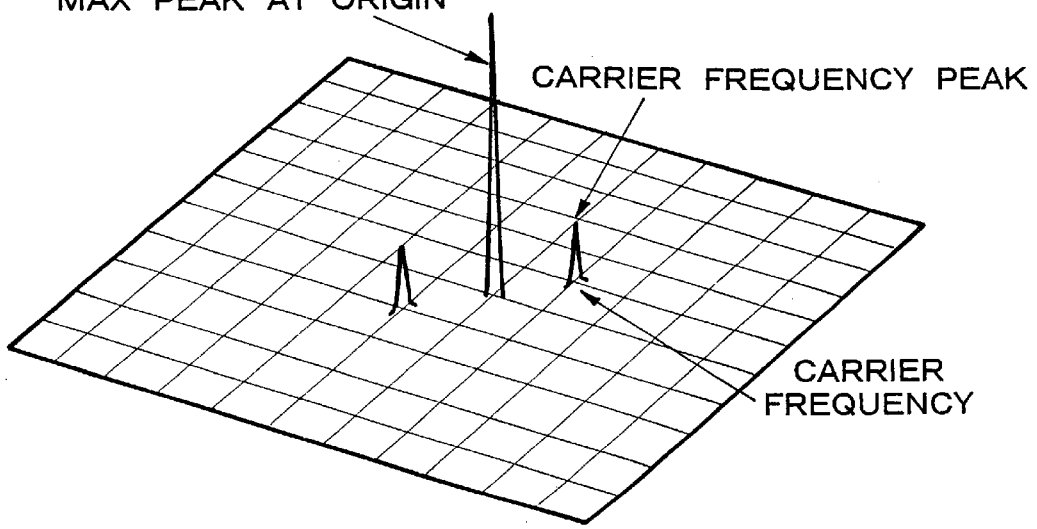
FIG. 12 is a view for explaining a mode of the carrier frequency calculating means shown in FIG. 10.

For extracting the value ($f_x$, $f_y$) of carrier frequency (frequency of carrier fringes) by using the carrier frequency calculating means 11, the following technique is effective. Namely, the above-mentioned expression (8) obtained by subjecting the captured fringe image data to Fourier transform is expanded on a frequency coordinate system as shown in FIG. 12. Then, among the peaks of this Fourier spectrum excluding the peak positioned at the origin, the maximum peak is detected. Though two peaks having the same magnitude are detected on both sides of the origin here, they are conjugate with each other, so that it will be sufficient if one of these peaks is chosen. The positional coordinates ($f_x$, $f_y$) of thus chosen peak on the frequency coordinate system are the values of carrier frequency to be extracted. Such a technique enables automation.

The fringe analysis method and apparatus using Fourier transform in accordance with the present invention is not restricted to the above-mentioned embodiment, and can be modified in various manners. For example, the mechanism for generating a carrier frequency is not limited to those adjusting the relative inclination of the object and the reference surface with respect to each other as mentioned above, as long as the relative inclination of a wavefront from the object and a wavefront from the reference with respect to each other can be adjusted accurately. For instance, a predetermined light modulating device or wedge-shaped optical system may be inserted in at least one of optical paths such that the inclination of the wavefront from the object or reference is adjustable. Also, after a predetermined carrier frequency is generated, the wavelength difference between two luminous fluxes may be changed, so as to increase or decrease the carrier frequency.

Though the carrier frequency is preferably set to a substantially integral multiple of the basic frequency determined by the surface profile information of the object and observing means, the operations and effects of the present invention can be attained as mentioned above even when it is not substantially an integral multiple.

Though the reference surface is inclined by a PZT actuator in the above-mentioned embodiment, the object may be inclined instead.

The inclination amount adjusting means for inclining the reference surface and/or object is not always restricted to the PZT actuator, as long as it can incline the reference surface and/or object accurately. Though one fulcrum member and two PZT devices are disposed exactly at respective vertices of a rectangular triangle in a mode for arranging these three members in the above-mentioned embodiment, the aimed effects can be obtained when the three members are arranged so as to form respective vertices of a given triangle on the reference mirror. Also, three PZT devices may be provided in place of one fulcrum and two PZT devices.

Though a spatial carrier frequency is used as the carrier frequency in the above-mentioned embodiment, a time carrier frequency or time-spatial frequency can be used as the carrier frequency of the present invention.

Though the interference fringe image data is captured by use of a Michelson type interferometer in the above-mentioned embodiment, the present invention is similarly applicable to the interference fringe image data obtained by use of other interferometers such as those of Fizeau type as a matter of course.

Further, the present invention is applicable not only to interference fringes but also to moire fringes, speckle fringes, and other various kinds of fringes.

In the fringe analysis method and apparatus using Fourier transform in accordance with the present invention, when fringe image data is determined in a state where a wavefront from an object and a wavefront from a reference are relatively inclined with respect to each other by a minute amount, and a carrier fringe occurring due to this inclination is superposed on a fringe occurring due to wavefront information of the object, the inclination is set such that the carrier frequency occurring due to the inclination is a predetermined multiple of the basic frequency determined by the wavefront information of the object and observing means, whereby the posture of object can efficiently be determined according to the fringe image data.

If the predetermined multiple is set to a substantially integral multiple, then the error in arithmetic operation can be reduced when carrying out Fourier transform method for the fringe image data, whereby the results of fringe analysis can be made favorable with less errors.

What is claimed is:

1. A fringe analysis method using Fourier transform, in which fringe image data carrying wavefront information of an object is obtained according to a relative wavefront profile of said object with respect to a reference, said fringe image data being in a state where a wavefront from said object and a wavefront from said reference are relatively inclined by a minute amount with respect to each other and a carrier fringe occurring due to said inclination is superposed on a fringe occurring due to said wavefront information of said object;

said fringe analysis method comprising a step of subjecting said fringe image data to Fourier transform method so as to determine a wavefront profile of the object;

wherein said inclination is set such that a carrier frequency occurring due to said inclination is a substantially integral multiple of a basic frequency determined by said wavefront information of said object and observing means.

2. A fringe analysis method according to claim 1, wherein said fringe image data is an interference fringe image data.

3. A fringe analysis apparatus using Fourier transform method, in which fringe image data carrying wavefront information of an object obtained according to a relative wavefront profile of said object with respect to a reference is subjected to Fourier transform method so as to determine a wavefront profile of said object;

said apparatus comprising:
an inclination adjusting mechanism for adjusting a relative inclination of a wavefront from said object and a wavefront from said reference with respect to each other; and
an inclination adjusting mechanism driving means for driving said inclination adjusting mechanism such that a carrier frequency occurring due to said inclination is a substantially integral multiple of a basic frequency determined by said wavefront information of said object and observing means.

4. A fringe analysis apparatus according to claim 3, wherein said fringe image data is an interference fringe image data.

5. A fringe analysis apparatus according to claim 3, wherein said fringe image data is captured by use of a Michelson type interferometer.

6. A fringe analysis apparatus according to claim 3, wherein said inclination adjusting mechanism adjusts a relative inclination of said object and said reference with respect to each other; and wherein said inclination adjusting mechanism driving means drives said inclination adjusting mechanism such that a carrier frequency occurring due to said inclination is substantially an integral multiple of said basic frequency.

7. A fringe analysis apparatus according to claim 4, wherein said inclination adjusting mechanism comprises members composed of one fulcrum member and two piezoelectric actuators or three piezoelectric actuators for inclining said object or a reference member provided with said reference, said members being arranged such that two lines on said reference member connecting said fulcrum member to the respective piezoelectric actuators are orthogonal to each other.

8. A fringe analysis apparatus according to claim 4, wherein said inclination adjusting mechanism comprises a tube-shaped piezoelectric actuator, adapted to freely incline in two axial directions, for driving said object or a reference member provided with said reference.

9. A fringe analysis apparatus according to claim 4, further comprising:
imaging means for capturing said fringe image;
carrier frequency calculating means for calculating according to captured fringe image data a carrier frequency occurring in response to a relative inclination of said object and said reference with respect to each other;
frequency difference calculating means for calculating a difference between said carrier frequency becoming an integral multiple of a basic frequency determined by said wavefront information of said object and observing means, and said calculated carrier frequency; and
inclination amount adjusting means for calculating a relative inclination amount of said object and said reference with respect to each other which is required for correcting said difference between frequencies and sending out a signal corresponding to thus calculated inclination amount to said inclination adjusting mechanism driving means.

10. A fringe analysis apparatus according to claim 9, wherein said carrier frequency calculating means carries out calculation such that said captured fringe image data is subjected to Fourier transform method, so as to determine a carrier frequency value ($f_x$, $f_y$) according to positional coordinates of a maximum peak excluding a peak located at the origin among peaks on a frequency coordinate system obtained by said Fourier transform method.

* * * * *

UNITED STATES PATENT AND TRADEMARK OFFICE
CERTIFICATE OF CORRECTION

PATENT NO. : 6,621,579 B2
DATED : September 16, 2003
INVENTOR(S) : Zongtao Ge

It is certified that error appears in the above-identified patent and that said Letters Patent is hereby corrected as shown below:

Column 11,
Line 35, delete the number "4" and substitute therefore -- 6 --

Column 12,
Lines 5 and 10, delete the number "4" and substitute therefore -- 6 --

Signed and Sealed this

Twenty-seventh Day of January, 2004

JON W. DUDAS
*Acting Director of the United States Patent and Trademark Office*